INVENTORS
JAMES P. CORBETT
GIACOMO (N) VARGIU
BY Thomas C. Schatzel
ATTORNEY

INVENTORS
JAMES P. CORBETT
GIACOMO (N) VARGIU
BY Thomas E. Schatzel
ATTORNEY

INVENTORS
JAMES P. CORBETT
GIACOMO (N) VARGIL

BY

Thomas C. Schatzel

ATTORNEY

United States Patent Office 3,526,726
Patented Sept. 1, 1970

3,526,726

PIEZOELECTRIC TRANSDUCER ASSEMBLY FOR POSITIONING A MAGNETIC RECORD/REPRODUCE HEAD

James P. Corbett, Palo Alto, and Giacomo Vargiu, Redwood City, Calif., assignors to Ampex Corporation, Redwood City, Calif., a corporation of California Filed Sept. 27, 1967, Ser. No. 670,883
Int. Cl. G11b *21/10;* H01v *7/00*
U.S. Cl. 179—100.2 7 Claims

ABSTRACT OF THE DISCLOSURE

An electrical positional control system including mounting assembly for a movable element, e.g. a magnetic head for a magnetic tape recorder/reproducer; said element being suspended about piezoelectric transducers which transducers are responsive to correcting signals for reducing relative physical displacement errors of said element, e.g. head displacement relative to the tape in a magnetic tape recorder/reproducer. Said correcting signals may be in the form of signals to correct for skew, time base error or guide errors in tape recorder/reproducers.

The invention herein described was made in the course of a contract with the Department of the United States Navy.

BACKGROUND OF THE INVENTION

The present invention pertains to a system for continuously controlling the physical positional relationship between two bodies. It has proven to provide highly beneficial use in adjusting the physical positional relationship between reproduce heads and a tape medium passing adjacent thereto in tape recorder/reproducers. Accordingly, for illustrative purposes the description will center about a feedback loop including the head assembly for such systems. However, as will be evident to those skilled in the art, the invention is not so limited in its applications.

Variations in head-to-tape relationship have imposed major limitations in the performance of many of today's highly precise tape recorder/reproducer systems. In multichannel longitudinal systems, these variations are explicit as relative time displacement between tracks of the same head (skew error) and time displacement between any track and a reference signal (time base error). Also, variations due to guiding limitations are commonly encountered.

There are two known ways to compensate for these displacement errors: controlled mechanical displacement of the heads, and variable delay of the reproduced signal. In both instances, if the four outer tracks of a pair of reproduce heads are used as control tracks, they provide four independent signals indicative of timing errors present in the reproduced signals.

Variable delay of the reproduced signal can be accomplished by means of a delay line with reactive components or by a sampling system with a variable sampling rate. If the required maximum time correction approaches or exceeds one period of the highest recorded frequency, each signal track may require a separate system formed by a large number of synchronized stages of delay or of sampling connected in series. Such a technique, using only variable delay, would be expensive, complex and introduce amplitude and phase distortion that may approach the size of the errors being corrected. However, it has been discovered that if the larger amplitude and lower frequency errors are corrected by means of physical head displacement so that the remaining time correction is limited to a fraction of the duration of the shortest recorded wavelength and extends over a frequency spectrum starting at a relatively high frequency, e.g. 5 kHz., the remaining displacement may be corrected in a practical and advantageous means by means of a delay line as described.

SUMMARY OF THE INVENTION

The present invention pertains to a device which is to be precisely position, e.g. the reproduce head of a magnetic tape recorder/reproducer in relationship to the magnetic tape passing adjacent thereto. The head is suspended by independent piezoelectric transducers in a bending mode. The head may be suspended such that it can move along any or all degrees of freedom of rotation and translation in three dimensions. Such arrangements allow simultaneous and independent correction of skew, guide and time base errors among others, by applying correcting signals through proper interconnections to the piezoelectric transducer electrodes. The piezoelectric transducers bend as a function of the signals and move the head so as to reduce the displacement errors.

The correcting signals may be derived from a tape medium sensed by the reproduce head. Control signals are recorded on the control tracks simultaneously with the data signals recorded on the data tracks. The reproduce head includes control tracks which sense the control signals. A reference timing signal representative of desired head position, is generated within associated electronics. The control and reference signals are applied to a phase detector, the output of which is proportional to the timing difference between the two signals, and therefore to the displacement error of the tape medium relative to the reproduce head. The error signal is then processed and transformed into a correcting signal which is applied to the piezoelectric transducers. The transducers respond accordingly and physically displace the head toward reducing the error. It has also been found that the correcting signal may be simultaneously used to control the tape speed by applying the signal to a responsive tape velocity control means. Illustratively, the signal may be applied to a summer network, the output of which controls excitation to a capstan motor so that the tape speed is simultaneously controlled with the head.

DESCRIPTION OF THE PREFERRED EMBODIMENTS

Figure 1:
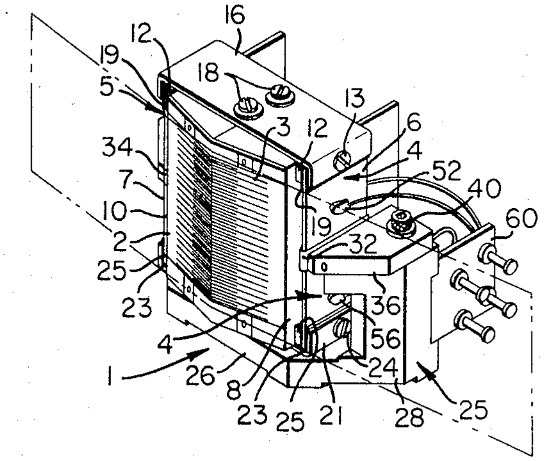
FIG. 1 is an isometric view of a multi-track reproduce head assembly for a magnetic tape recorder/reproducer with the head suspended by two piezoelectric transducers according to the teachings of the present invention.

The head assembly configuration, referred to by the general reference character 1 includes a standard composite multi-track reproduce head 2 with a stack 3 of individual heads. The illustrated head assembly 2 is similar to assemblies commonly used on commercially available instrumentation type recorder/reproducers. The heads are designed to be mounted on a tape transport (not shown) so as to sense and transfer prerecorded signals of a magnetic tape illustrated in ghost in FIG. 1 driven past the head. In FIG. 1 the head 2 is suspended by a pair of piezoelectric transducers referred to by the general reference characters 4 and 5. The transducers 4 and 5 are commercially available in various forms and materials. As illustrated each includes a plate designated 6 and 7, respectively, placed parallel with opposing longitudinal surfaces 8 and 10 of the head 2. The plates 6 and 7 may be selected from various known materials compatible with piezoelectric transducers, e.g. a sandwich of beryllium copper between two layers of barium titanate ceramic.

The top longitudinal ends of the plates 6 and 7 of the transducers 4 and 5 are joined, by means of pads 12 and screws 13, to an inverted U-shaped support member 16. The support member 16 is of an elastic material joining the top surface of the head 2 by means of a pair of fastener screws 18. The fasteners 18 aid in securing the head vertically while simultaneously allowing the member 16 to shift left or right thereby allowing for translational and rotational movement of the head 2. The support 16 may include a beryllium copper material with insulative pads 19 intermediate the plates 6 and 7.

The bottom longitudinal ends of the transducers 4 and 5 are joined by a U-shaped support member 21 similar to the member 16 and joining the bottom surface of the head 2 by means of a pair of fastener screws 22. The member 21 if electrically conductive, may be insulated from the transducers 4 and 5 by a pair of insulative pads 23 and secured by associated fastener screws 24 and pads 25.

The head 2 and associated transducers 4 and 5 are supported by support means illustrated in the form of a base member referred to by the general reference character 25. The base 25 includes a bottom surface 26 and a pair of vertical surfaces 28 and 30. The vertical surfaces 28 and 30 respectively, engage the transducers 4 and 5 at approximately the midpoint of the transducers 4 and 5 by means of an insulative binding 32 and 34 rigidly securing the respective vertical surfaces 28 or 30 and plates 6 or 7. The point of engagement of the plates 6, 7 with the surfaces 28, 30 serve as the central support for the respective parallel plates 6 and 7 about which the plates exercise their bending motion. In the illustrated embodiment the bindings 32 and 34 are each mechanically joined to a respective mounting plate 36 or 38, fastened to the vertical surfaces 28 and 30 by fasteners 40 and 42, respectively.

Figure 2:
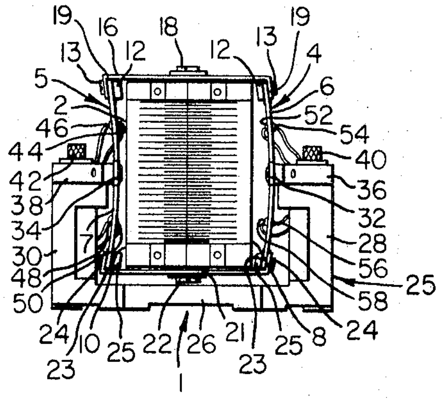
FIG. 2 is a front view of the assembly of FIG. 1 with the transducers bent to urge shifting displacement of the head in one transverse direction to correct for time base errors (TBE)
Figure 3:
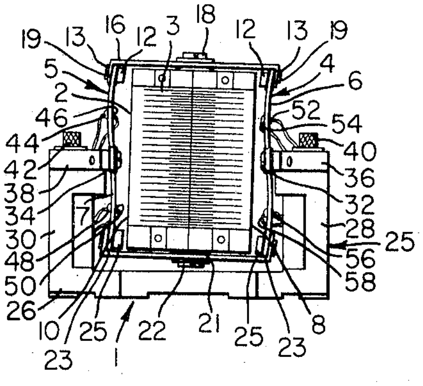
FIG. 3 is a front view of the assembly of FIG. 1 with the transducers bent to urge rotation of the head in one direction to correct for skew.

The transducers 4 and 5 are arranged to work in parallel. Each have a point of rotation so that each one half of each transducer plate 7 and 8 will displace one side of the head stack. Thus, the top and bottom of each stack can be displaced independently. For illustrative purposes, the transducer electrodes will be designated "positive" and "negative." The respective transducers are responsive dependent upon which is excited. The transducer 5 has a positive electrode 44 and a negative electrode 46 on the upper one half and a negative electrode 48 and a positive electrode 50 on the lower one half. At the same time, the transducer 4 has a negative electrode 52 and a positive electrode 54 on the upper one half and a positive electrode 56 and negative electrode 58 on the bottom half. The electrodes are connected to independent terminals of a terminal board 60. As will be hereinafter discussed in further detail the electrodes receive correcting signals of the desired polarity and magnitude to cause appropriate bending of the transducer plates 6 and 7. This in turn physically displaces the head 2 to minimize placement errors in relationship to the track alignment of signals on the tape medium passing the stack 3. FIGS. 2 and 3 diagrammatically illustrate this facet. FIG. 2 illustrates a shifting of the head 2 towards the left. To realize the shift, the electrodes 44, 50, 54, and 56 receive similar signals. Likewise, the terminals 46, 48, 52, 58 receive signals similar to each other. Thus, the bottom and top of the plate 7 bend clockwise and counterclockwise, respectively, an equal amount about the fastener 34. The same is true with the plate 6 about the fastener 32. Thus, as illustrated in FIG. 2, this results in a shift of the members 16 and 21 to the left. Since the members 16 and 21 are secured to the head 2 by means of the fasteners 18 and 22, respectively, the head 2 shifts tending to minimize time base errors. Obviously, if the correcting signals were each of the opposite polarity, the shift would be in the opposite direction. The magnitude of the correcting signals determines the amount of shift.

The illustrated configuration allows for simultaneous and independent correction of skews and time base errors (TBE). FIG. 3 illustrates the situation when skew displacements are to be corrected. Under such conditions the top and bottom halves of the plates 6 and 7 bend in opposite directions, i.e. the members 16 and 21 and the head 2 tend to rotate.

Figure 4:
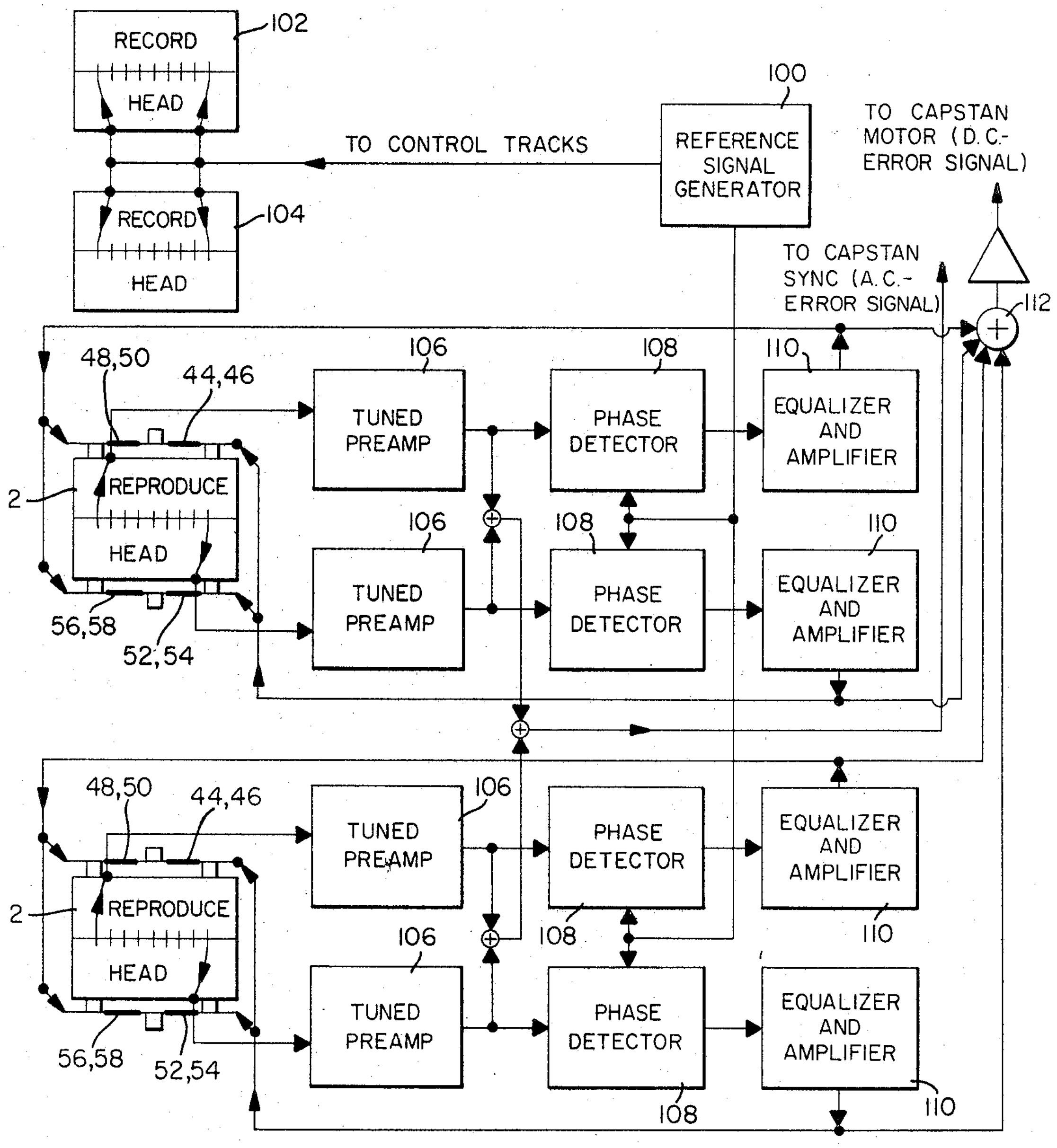
FIG. 4 is a block diagram of the electrical circuitry and associated reproduce and record heads for correcting time base error and skew displacement of the reproduce heads.

FIG. 4 illustrates in block diagram form a system for generating the appropriate correcting signals and applying them to a head assembly 1 for minimizing displacement errors. The diagram illustrates a system utilizing a pair of record heads, a pair of reproduce heads, and four independent feedback loops. The various electronic circuits are functionally designated and it will be obvious to those skilled in the art that various configurations may be used to realize the designated function of each circuit.

On the record side a reference signal source 100 provides a periodic signal, to the four outside tracks of a pair of record heads 102 and 104. Dependent on whether there are unique requirements due to the environment, the reference signal may take the form of a sinewave at a select frequency. Generally, the frequency can be chosen within a wide range within the bandpass of the system. This reference signal is recorded on the tape medium passing thereover.

On the reproduce side there are four similar channels. The reproduce heads 2 each have a control track on each extreme end of the stack for sensing prerecorded control track signals on the tape passing adjacent thereto. As the tape passes the control tracks a feedback signal is generated for each control track. Each feedback signal is amplified in a preamplifier 106 and tuned to the select frequency. The feedback signals are representative of the actual positional relationship between the head and tape. The feedback signals are each processed and amplified to a desired level and, together with the respective reference signal from the generator 100 are applied to a detecting means for detecting the time difference between the signals and producing an error signal indicative of the difference. In FIG. 4 the detecting means includes a phase detector 108 and an equalizer-amplifier circuit 110. The phase detectors 108 are preferably designed to respond only to the zero crossing of each period to avoid interpreting dropouts and any other amplitude modulation present. This can be done by adequate circuitry within the phase detector 108 or by the insertion of a limiting stage (not shown). A timing error of the control track will appear as a phase difference at the inputs of the phase detector. The output of the detector 108 may be a DC signal with amplitude and polarity being a function of the inputs. Accordingly, the instantaneous value of the phase detector output will be proportional to the displacement error at the control track of the reproduce head. The error signal from the phase detector 108 may then be passed through the equalizer and amplifier stage 110. Within the stage 110, the signal is suitably amplified and equalized to obtain the desired correction factor and stability. The correcting signal is then applied to and received by the piezoelectric transducers 4 and 5 at the respective electrodes 44, 46, 48, 50, 52, 54, 56, and 58. The bending modes of the piezoelectric transducers respond and displace the reproduce heads 2 towards reducing the error of the control tracks and thereby closing the loop. Therefore using appropriate error signals, the top and bottom of each head 2 can be displaced independently. This is equivalent to translation and rotation or time base and skew by changing the frame of reference.

As further illustrated by FIG. 4, optimum simultaneous operation with the capstan servo of a tape transport can be assured by obtaining the capstan sync signal through an even summation of the four control tracks through a summer 112. This has been found to avoid the need for a tachometer on the capstan shaft. Preferably the low frequency gain is kept higher in the capstan servo. This has been found not to impose limitations because the gain crossover of the two systems can occur at a fraction of a cycle where the capstan servo performs satisfactorily. Alternately, the capstan error signal can be obtained directly by combining the signals applied to the transducers, and fed to the capstan drive amplifier after multiple equalization to assure stability. The capstan servo controls the excitation to the capstan motor and tape velocity.

Figure 5:
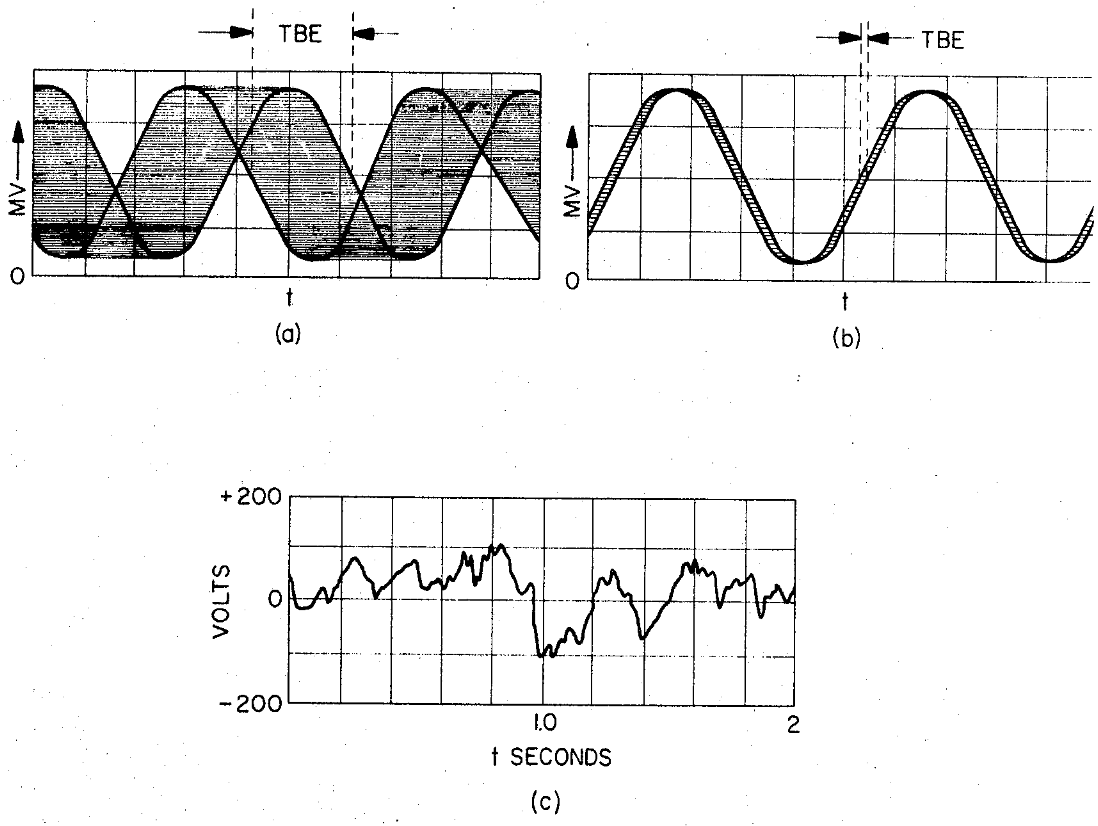
FIGS. 5(*a*), (*b*) and (*c*) are reproductions of oscillograms respectively illustrating time base error (not compensated), time base error (compensated) and correction signals of a system incorporating the teachings of the present invention.

The oscillograms of FIGS. 5(*a*), (*b*) and (*c*) indicate the time base error (TBE) performance of a system on which head assemblies according to the present invention were connected for TBE correction. In FIG. 5(*a*), the output of the tuned preamp 106 is shown with a standard head assembly without the teachings of the present invention. As indicated by the vertical broken lines the time displacement is substantial. In tested models this displacement was commonly on the order of 20 microseconds. FIG. 5(*b*) illustrates a similar diagram with a closed loop and with the head suspended in piezoelectric transducers according to the teachings of the present invention. In this instance, the displacement was in the order of two microseconds. To more clearly demonstrate the nature of the correcting signals, FIG. 5(*c*) illustrates the oscillogram of a correction signal applied to the piezoelectric transducer plates 4 and 5 using the system of FIG. 4.

Figure 6:
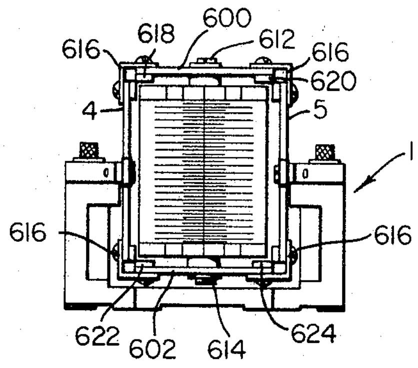
FIG. 6 illustrates the front view of a multi-track reproduce head assembly suspended by four piezoelectric transducers so as to correct for time base errors, skew and guide displacements.

FIG. 6 illustrates a head assembly 1 with a pair of transducers 600 and 602 to aid in minimizing vertical positional errors of said head which may be in the form of guide errors. The transducer 600 is parallel across the top plane of the head 2. Likewise the transducer 602 is parallel across the bottom plane. The transducers 600 and 602 are respectively secured to the head 2 by screw fasteners 612 and 614.

The transducers 600 and 602 join the transducers 4 and 5 by L-shaped supports 616 secured at each corner by means of pads 618, 620, 622, 624 and associated screw fasteners. The transducers 600 and 602 respond to appropriate signals shifting the head 2 vertically. Obviously, the control signals may be generated by electronics similar to that previously discussed.

The discussion has centered about correcting for TBE, skew and guide errors. It may be noted that if only TBE errors are pertinent only one transducer is necessary. Likewise, if only guide errors are of concern one transducer may serve the purpose.

We claim:

1. A system for controlling the orientation of a magnetic record/reproduce head of a magnetic tape recorder/reproducer comprising;
- a magnetic head adapted to be positioned with respect to a magnetic tape passing adjacent thereto;
- a pair of piezoelectric transducer elements mounted adjacent opposing sides of said head and having elongate axes disposed substantially normal to a designated direction of tape travel across said heads;
- support means for supporting said head and elements, said head being movable in a rotational and/or translational relationship to said support means in response to piezoelectric movement of said elements; and
- means for generating and applying to said elements corrective control signals representative of the difference between actual and a desired position of said head.

2. The control system of claim 1 in which each element is supported by the support means at an approximate longitudinal midpoint about which support point the elements may exercise a bending motion.

3. The control system of claim 2 in which the elements each have electrodes on opposing longitudinal surfaces on each side of the respective support points.

4. The control system of claim 3 further including an additional pair of piezoelectric transducer elements, each placed substantially normal to the first named pair of elements and adjacent to opposing top and bottom surfaces of said head, the bending mode each of said additional pair of elements adapted to be responsive to control signals for correcting vertical positional guiding errors of said head relative to said tape.

5. The control system of claim 2 in which the means for generating corrective control signals include a reference signal generator generating a periodic signal of select frequency, a control track adjacent each end of said head for sensing control track signals prerecorded on opposing end tracks of said tape, and means reproducing said control track signals from said end tracks to develop feedback signals representative of the actual head position in relationship to the tape, detecting means receiving said reference and feedback signals and developing corrective control signals representative of the difference between each associated feedback signal and reference signal, each corrective signal being delivered to an independent transducer element.

6. The control system of claim 5 in which each feedback signal is received by a separate channel, each channel including a tuner for tuning the respective feedback signal to a select frequency coinciding with the reference signal; and
- said detecting means includes a phase detector in each channel, each phase detector receiving the associated feedback signal and the reference signal and responsive to the zero crossing of each period of said signals, said detectors each producing a DC output correcting signal having a polarity and magnitude dependent on the phase relationship of the reference and associated feedback signals.

7. The control system of claim 5 in which the recorder/reproducer includes a capstan servo, responsive to the output of a summer network, said correcting signals are simultaneously applied to the associated transducer elements and said summer, said summer providing an output correcting signal for driving said capstan responsive to the nature of the correcting signals.

References Cited

UNITED STATES PATENTS

| | | | |
|---|---|---|---|
| 2,751,439 | 6/1956 | Burton | 340—174.1 |
| 3,387,295 | 6/1968 | De Moss | 179—100.2 |

TERRELL W. FEARS, Primary Examiner

R. S. TUPPER, Assistant Examiner

U.S. Cl. X.R.

310—8; 340—174.1